United States Patent [19]
Sturni et al.

[11] 4,035,275
[45] July 12, 1977

[54] NOVEL PIGMENT GRINDING VEHICLES

[75] Inventors: Lance C. Sturni, McKeesport; Joseph F. Bosso, Lower Burrell, both of Pa.

[73] Assignee: PPG Industries, Inc., Pittsburgh, Pa.

[21] Appl. No.: 631,258

[22] Filed: Nov. 12, 1975

Related U.S. Application Data

[60] Division of Ser. No. 439,184, Feb. 4, 1974, Pat. No. 3,936,405, which is a continuation-in-part of Ser. No. 281,098, Aug. 16, 1972, abandoned.

[51] Int. Cl.$^2$ .................................... C25D 13/06
[52] U.S. Cl. ............................................. 204/181
[58] Field of Search ............... 204/181; 260/29.22 P

[56] References Cited
U.S. PATENT DOCUMENTS

| | | | |
|---|---|---|---|
| 3,793,278 | 2/1974 | De Bona | 204/181 |
| 3,799,854 | 3/1974 | Jerabek | 204/181 |
| 3,839,252 | 10/1974 | Bosso et al. | 204/181 |
| 3,894,922 | 7/1975 | Bosso et al. | 204/181 |
| 3,925,180 | 12/1975 | Jerabek | 204/181 |
| 3,937,679 | 2/1976 | Bosso et al. | 204/181 |
| 3,947,339 | 3/1976 | Jerabek et al. | 204/181 |

*Primary Examiner*—T. Tung
*Attorney, Agent, or Firm*—William J. Uhl

[57] ABSTRACT

It has been found that quaternary onium (e.g., ammonium, sulfonium, and phosphonium) salt group-containing epoxy resins are particularly useful as grinding media in preparing stable pigment disperions useful in water-dispersible coating systems, for example, electrodepositable compositions. The resins are prepared by reacting a material selected from the group consisting of amine salts, phosphine-acid mixtures, and sulfide-acid mixtures with a 1,2-epoxy group containing material wherein a ratio of at least about 0.4 equivalents of quaternary onium groups are produced per equivalent of epoxy group initially present. Preferably, the system contains at least a small amount of polyoxyalkylene glycol.

4 Claims, No Drawings

NOVEL PIGMENT GRINDING VEHICLES

CROSS-REFERENCE TO RELATED APPLICATION

This is a division of application Ser. No. 439,184, filed Feb. 4, 1974, now U.S. Pat. No. 3,936,405, issued Feb. 3, 1976, which is a continuation-in-part of application Ser. No. 281,098, filed Aug. 16, 1972, now abandoned.

STATE OF THE ART

In the formulation of paint compositions and especially electrodepositable paint compositions, an important factor is the introduction of pigments into the coating composition. Pigments are typically ground in a dispersing agent and then the resultant pigment paste is incorporated into the coating composition to give the coating composition proper color, or opacity, and application or film properties.

The time required for grinding and dispersing pigments poses a problem in some instances. Further, electrodepositable compositions have been frequently found wherein the resin which ultimately makes up the majority of the vehicle present in the composition is not suitable as a grinding medium, since the pigment paste formed does not have stable properties and, upon storage for any length of time, produces a composition which cannot be readily dispersed and/or which adversely affects the properties of the elctrodepositable composition ultimately formed.

DESCRIPTION OF THE INVENTION

It has now been found that where an epoxy group containing quaternary onium (e.g., ammonium, sulfonium or phosphonium) base salt group solubilized resin is employed as a grinding media in preparing stable pigment dispersions useful in water-dispersible coating systems that substantially improved stability is obtained where the ratio of final quaternary onium groups to initial epoxy groups is at least 0.4 to 1. Preferably, the grinding system contains at least a small amount of polyoxylkylene polyol.

The cationic resins which can be utilized in preparing the compositions of this invention are characterized as ungelled, water-dispersible resins containing quaternary onium (preferably ammonium) salt groups, and preferably containing epoxy groups. It has been found that the presentlypreferred resins are based on polyepoxide resins, wherein the resultant resin contains at least one free epoxy group per average molecule and wherein the resin contains oxyalkylene groups and/or the salt forming the quaternary onium salt of an acid having a dissociation constant greater than $1 \times 10^{-5}$.

Generally, the quaternary onium salt may be the salt of boric acid and/or an acid having a dissociation constant greater than boric acid, including organic and inorganic acids. Upon solubilization, at least a portion of the salt is preferably a salt of an acid having a dissociation constant greater than about $1 \times 10^{-5}$. Preferably the acid is an organic carboxylic acid. The presently preferred acid is lactic acid.

The presently preferred resins contain at least one epoxy group and preferably contain about 0.05 percent to about 16 percent by weight of nitrogen and at least about 1 percent of said nitrogen, preferably about 20 percent, more preferably about 50 percent and, most preferably, substantially all of the nitrogen being in the form of chemically-bound quaternary ammonium base salt groups; preferably the remainder of said nitrogen being in the form of amino nitrogen.

The epoxy group-containing organic material can be any monomeric or polymeric compound or a mixture of compounds having a 1,2-epoxy group. It is preferred that the epoxy-containing material have a 1,2-epoxy equivalency greater than 1.0, that is, in which the average number of 1,2-epoxy groups per molecule is greater than one. It is preferred that the epoxy compound be resinous or a polyepoxide, i.e., it contains more than one epoxy group per molecule. The polyepoxide can be any of the well-known epoxides. Examples of these polyepoxides have, for example, been described in U.S. Pat. Nos. 2,467,171; 2,615,007; 2,716,123; 3,030,336; 3,053,855 and 3,075,999. A useful class of polyepoxides are the polyglycidyl ethers of polyphenols, such as Bisphenol A. These may be produced, for example, by etherification of a polyphenol with epichlorohydrin or dichlorohydrin in the presence of an alkali. The phenolic compound may be bis(4-hydroxyphenyl)2, 2-propane, 4,4'-dihydroxybenzophenone, bis(4-hydroxphenyl)1,1-ethane, bis(4-hydroxyphenyl)1,1-isobutane; bis(4-hydroxytertiarybutylphenyl)2,2-propane, bis(2-hydroxynaphthyl)methane, 1,5-hydroxynaphthalene, or the like. Another quite useful class of polyepoxides are produced similarly from novolak resins or similar polyphenol resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, bis(4-hydroxycyclohexyl)2, 2-propane, and the like.

There can also be used polyglycidyl esters of polycarboxylic acids which are produced by the reaction of epichlorohydrin or a similar epoxy compound with an aliphatic or aromatic polycarboxylic acid, such as oxalic acid, succinic acid, glutaric acid, terephthalic acid, 2,6-naphthylene dicarboxylic acid, dimerized linolenic acid, and the like. Examples are diglycidyl adipate and diglycidyl phthalate.

Also useful are polyepoxides derived from the epoxidation of an olefinically unsaturated alicyclic compound. Included are diepoxides comprising, in part, one or more monoepoxides. These polyepoxides are nonphenolic and are obtained by epoxidation of alicyclic olefins, for example, by oxygen and selected metal catalysts, by perbenzoic acid, by acetaldehyde monoperacetate or by peracetic acid. Among such polyepoxides are the epoxy alicyclic ethers and esters which are well known in the art.

Another class of polyepoxides are those containing oxyalkylene groups in the epoxy molecule. Such oxyalkylene groups are typically groups of the general formula:

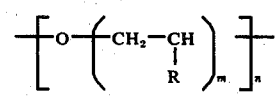

where R is hydrogen or alkyl, preferably lower alkyl (e.g., having 1 to 6 carbon atoms) and where, in most instances, m is 1 to 4 and n is 2 to 50. Such groups can be pendant to the main molecular chain of the polyepoxide or part of the main chain itself. The proportion of oxyalkylene groups in the polyepoxide depends upon many factors, including the chain length of the oxyalkylene group, the nature of the epoxy and the degree of water solubility desired. Usually the epoxy contains at least about 1 percent by weight or more, and preferably 5 percent or more of oxyalkylene groups.

Some polyepoxides containing oxyalkylene groups are produced by reacting some of the epoxy groups of a polyepoxide, such as the epoxy resins mentioned above, with a monohydric alcohol containing oxyalkylene groups. Such monohydric alcohols are conveniently produced by oxyalkylating an alcohol, such as methanol, ethanol, or other alkanol, with an alkylene oxide. Ethylene oxide, 1,2-propylene oxide and 1,2-butylene oxide are especially useful alkylene oxides. Other monohydric alcohols can be, for example, the commercially available materials known as Cellosolves and Carbitols, which are monoalkyl ethers of polyalkylene glycols. The reaction of the monohydric alcohol and the polyepoxide is generally carried out in the presence of a catalyst. Formic acid, dimethylethanolamine, diethylethanolamine, N,N-dimethylbenzylamine and, in some cases, stannous chloride are useful for this purpose.

Similar polyepoxides containing oxyalkylene groups can be produced by oxyalkylating the epoxy resin by other means, such as by direct reaction with an alkylene oxide.

The polyepoxide employed to produce the foregoing epoxies containing oxyalkylene groups contain a sufficient number of epoxy groups so that the average number of residual epoxy groups per molecule remaining in the product after the oxylalkylation is greater than 1.0. Where oxyalkylene groups are present, the epoxy resin preferably contains from about 1.0 to about 90 percent or more by weight of oxyalkylene groups.

Other epoxy-containing compounds and resins include nitrogeneous diepoxides such as disclosed in U.S. Pat. No. 3,365,471; epoxy resins from 1,1-methylene bis(5-substituted hydantoin), U.S. Pat. No. 3,391,097; bisimide containing diepoxides, U.S. Pat. No. 3,450,711; epoxylated aminomethyldiphenyl oxides, U.S. Pat. No. 3,312,664, heterocyclic N,N'-diglycidyl compounds, U.S. Pat. No. 3,503,979; amino epoxy phosphonates, British Pat. No. 1,172,916; 1,3,5-triglycidyl isocyanurates, as well as other epoxy-containing materials known in the art.

Another class of resins which may be employed are acrylic polymers containing epoxy groups. Preferably these acrylic polymers are polymers formed by copolymerizing an unsaturated epoxy-containing monomer, such as, for example, glycidyl acrylate or methacrylate.

Any polymerizable monomeric compound containing at least one $CH_2=C$ group, preferably in terminal position, may be polymerized with the unsaturated glycidyl compounds. Examples of such monomers include:

1. Monoolefinic and diolefinic hydrocarbons, that is, monomers containing only atoms of hydrogen and carbon, such as styrene, alpha-methyl styrene, alpha-ethyl styrene, isobutylene (2-methyl propene-1), 2-methyl-butene-1, 2-methyl-pentene-1, 2,3-dimethyl-butene-1, 2,3 dimethyl-pentene-1, 2,4-dimethyl-pentene-1, 2,3,3-trimethyl-butene-1, 2-methyl-heptene-1, 2,3-dimethyl-hexene-1, 2,4-dimethyl-hexene-1, 2,5-dimethyl-hexene-1, 2-methyl-3-ethyl-pentene-1, 2,3,3-trimethyl-pentene-1, 2,3,4-trimethyl-pentene-1, 2-methyl-octene-1, 2,6-dimethyl-heptene-1, 2,6-dimethyl-octene-1, 2,3-dimethyl-decene-1, 2-methyl-nonadecene-1, ethylene, propylene, butylene, amylene, hexylene, butadiene-1,3, isoprene, and the like;

2. Halogenated monoolefinic and diolefinic hydrocarbons, that is monomers containing carbon, hydrogen, and one or more halogen atoms, such as alpha-chlorostyrene, alpha-bromostyrene, 2,5-dichlorostyrene, 2,5-dibromostyrene, 3,4-dichlorostyrene, ortho-, meta- and para-fluorostyrenes, 2,6-dichlorostyrene, 2,6-difluorostyrene, 3-fluoro-4-chlorostyrene, 3-chloro-4-fluorostyrene, 2,4,5-trichlorostyrene, dichloromonofluorostyrenes, 2-chloropropene, 2-chlorobutene, 2-chloropentene, 2-chlorohexene, 2-chloroheptent, 2-bromobutene, 2-bromoheptene, 2-fluorohexene, 2-fluorobutene, 2-iodopropene, 2-iodopentene, 4-bromoheptene, 4-chloroheptene, 4-fluoroheptene, cis- and trans-1,2-dichloroethylenes, 1,2-dibromoethylene, 1,2-difluoroethylene, 1,2-diiodoethylene, chloroethylene (vinyl chloride), 1,1-dichloroethylene (vinylidene chloride), bromoethylene, fluoroethylene, iodoethylene, 1,1-dibromoethylene, 1,1-fluoroethylene, 1,1-diiodoethylene, 1,1,2,2-tetrafluoroethylene, 1-chloro-2,2,2-trifluoroethylene, chlorobutadiene and other halogenated diolefinic compounds;

3. Esters of organic and inorganic acids, such as vinyl acetate, vinyl propionate, vinyl butyrate, vinyl isobutyrate, vinyl valarate, vinyl caproate, vinyl enanthate, vinyl benzoate, vinyl toluate, vinyl p-chlorobenzoate, vinyl-o-chlorobenzoate and similar vinyl halobenzoates, vinyl-p-methoxybenzoate, vinyl-o-methoxybenzoate, vinyl-p-ethoxybenzoate, methyl metha crylate, ethyl methacrylate, propyl methacrylate, butyl methacrylate, amyl methacrylate, hexyl methacrylate, heptyl methacrylate, heptyl methacrylate, octyl methacrylate, decyl methacrylate, methyl crotonate, and ethyl tiglate;

Methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate, and dodecyl acrylate;

Isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl alpha-chloroacetate and isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate and vinyl alpha-bromovalerate;

Allyl chloride, allyl cyanide, allyl bromide, allyl fluoride, allyl iodide, allyl chlorocarbonate, allyl nitrate, allyl thiocyanate, allyl formate, allyl acetate, allyl propionate, allyl butyrate, allyl valerate, allyl caproate, allyl-3,5,5-trimethyl hexoate, ally benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, as well as methallyl esters corresponding to the above allyl esters, as well as esters from such alkenyl alcohols as beta-ethyl allyl alcohol, beta-propyl allyl alcohols, 1-butene-4-ol, 2-methyl-butene-4-ol, 2(2,2-dimethylpropyl)-1-butene-4-ol, and 1-pentene-4-ol;

Methyl alpha-chloroacrylate, methyl alpha-bromoacrylate, methyl alpha-fluoroacrylate, methyl alpha-iodoacrylate ethyl alpha, chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyanocrylate, ethyl alpha-cyanoacrylate, amyl alpha-cyanoacrylate and decyl alpha-cyano acrylate;

Dimethyl maleate, diethyl maleate, diallyl maleate, dimethyl fumarate, diethyl fumarate, dimethallyl fumarate and diethyl glutaconate;

4. Organic nitriles, such as acrylonitrile, methacrylonitrile, ethacrylonitrile, 3-octenenitrile, crotonitrile, oleonitrile, and the like.

In carrying out the polymerization reaction, techniques well known in the art may be employed. A peroxygen type catalyst is ordinarily utilized. Diazo compounds or redox catalyst systems can also be employed as catalysts.

The acrylic polymer may likewise be prepared with monomers of the type such that the final polymer contains potential crosslinking sites. Such monomers include acrylamides or methacrylamides, their N-methylol or N-methylol ether derivatives; unsaturated monomers containing capped isocyanate groups, or aziridyl groups; and hydroxy-containing unsaturated monomers, for example, hydroxyalkyl acrylates.

Another method of producing acrylic polymers which may be utilized in this invention is to react an acrylic polymer containing reactive sites, such as carboxyl groups or hydroxyl groups, secondary amine groups or other active hydrogen-containing sites, with an epoxy-containing compound such as the diglycidyl ether of Bisphenol A or other polyepoxides as enumerated elsewhere herein, to provide an epoxy group-containing acrylic polymer.

Vinyl addition polymers which contain alicyclic unsaturation can be epoxidized to form an epoxy group-containing polymer.

Yet another class of polymers which are useful in preparing the resins of this invention are isocyanate group-containing polyurethanes. The isocyanate-terminated polyurethane prepolymers employed as starting materials according to the present invention may be obtained by the reaction of a selected polymeric glycol. The polyurethane polymers include those which are prepared from polyalkylene ether glycols and diisocyanates. The term "polyalkylene ether glycol" as used herein refers to a polyalkylene ether which contains terminal hydroxy groups. They are sometimes known as polyoxyalkylene glycols, polyalkylene glycols, or polyalkylene oxide glycols, or dihydric polyoxyalkylenes. Those useful in preparing the products of this invention may be represented by the formula HO(-RO)$_n$H, in which R stands for an alkylene radical and $n$ is an integer. Glycols containing a mixture of radicals, as in the compound HO(CH$_2$OC$_2$H$_4$O)$_n$H, or HO(C$_2$H$_4$O)$_n$(C$_3$H$_6$O)$_m$(C$_2$H$_4$O)$_n$H, can be used. These glycols are either viscous liquids or waxy solids. Polytetramethylene ether glycols, also known as polybutylene ether glycols, may be employed. Polyethylene ether glycols and poly-propylene ether glycols, having the above-indicated formula, are among the preferred glycols. The presently preferred glycols are polypropylene glycols with a molecular weight between about 300 and about 1,000.

Any of a wide variety of organic polyisocyanates may be employed in the reaction, including aromatic aliphatic, and cycloaliphatic diisocyanates and combinations of these types.

Instead of the hydrocarbon portion of the polyether glycols used in forming the polyurethane products being entirely alkylene, it can contain arylene or cycloalkylene radicals together with the alkylene radicals as, for example, in the condensation product of a polyalkylene ether glycol with alpha, alpha'-dibromo-p-xylene in the presence of alkali. In such products, the cyclic groups inserted in the polyester chain are preferably phenylene, naphthylene or cyclohexylene radicals or those radicals containing alkyl or alkylene substituents, as in the tolylene, phenylethylene or xylene radicals.

Also included in the polyurethane products are those made from a substantially linear polyester and an organic diisocyanate of the previously described type. Products of this sort are described in U.S. Pat. Nos. 2,621,166; 2,625,531; and 2,625,532. The polyesters are prepared by reacting together glycols and dicarboxylic acids. Another useful group of compounds for this purpose are the polyester amide resins having terminal hydroxyl groups. The preferred polyesters may be represented by the formula HO—B—OOC—B'—COO$_n$—BOH, in which B and B' are hydrocarbon radicals derived from the glycol and dicarboxylic acid respectively and $n$ is an integer. In the preparation of these polyesters, the glycol is used in at least slight excess so that the polyesters contain terminal hydroxyl groups which are available for reaction with the isocyanates. The same polyisocyanates and reaction conditions useful in preparing polyurethanes from the polyalkylene ether glycols are also useful with the polyesters.

Polyurethane glycols may also be reacted with an organic polyisocyanate-terminated polyurethanes for use as starting materials in the present invention. The starting polyurethane glycol is prepared by reacting a molar excess of a polymeric glycol with an organic diisocyanate. The resulting polymer is a polyurethane containing terminal hydroxyl groups which may then be further reacted with additional polyisocyanate to produce the starting isocyanate-terminated polyurethane prepolymer.

Another starting polyurethane prepolymer may be such as disclosed in U.S. Pat. No. 2,861,981, namely, those prepared from a polyisocyanate and the reaction product of an ester of an organic carboxylic acid with an excess of a saturated aliphatic glycol having only carbon atoms in its carbon chain and a total of 8 to 14 carbon atoms, at least one two-carbon branch per molecule, and having terminal hydroxy groups separated by at least six carbon atoms.

It is obvious, from the above-described methods by which the polyurethane reaction products may be prepared and from the reactants used, that these products will contain a plurality of intralinear radicals of the formula —NH—CO—O—X—O—CO—NH—, wherein the bivalent radical —O—X—O— is obtained by removing the terminal hydrogen atoms of the polymeric glycol, said glycol being selected from the group consisting of polyalkylene ether glycols, polyurethane glycols, polyalkylene arylene ether glycols, polyalkylenecycloalkylene ether glycols, polyalkylene ether-polythioether glycols, polyester amide glycols of the formula:

HO—[B—O—CO—B'—CO—O]$_n$—B—OH where B and B' are hydrocarbon radicals and $n$ is an integer, and that a typical isocyanate-terminated polyurethane polymer produced from diisocyanates and dihydric glycols will, on an average, contain (at a 2:1 NCO:OH ratio) a plurality of intralinear molecules conforming to the formula:

OCN—Y—NH—CO—O—X—O—CO—NH—Y—NCO wherein —O—X—O has the value given previously and Y is the polyisocyanate hydrocarbon radical.

In the preparation of the starting polyurethane polymer, an excess of the organic polyisocyanate of the polymeric glycol is used, which may be only a slight excess over the stoichiometric amount (i.e., one equivalent of polyisocyanate for each equivalent of the polymeric glycol). In the case of a diisocyanate and a dihydric polyalkylene ether, the ratio of NCO to OH of the polyol will be at least one and may be up to a 3:1 equivalent ratio. The glycol and the isocyanate are ordinarily reacted by heating with agitation at a temperature of 50° C. to 130° C., preferably 70° C. to 120° C. The ratio of organic polyisocyanate compound to polymeric glycol is usually and preferably between about 1.3:1 and 2.0:1.

The reaction is preferably, but not necessarily, effected in the absence of a solvent, when the prepolymer is a fluid at processing temperatures. When it is not, or when it is desired to employ a solvent, convenient solvents are inert organic solvents having a boiling range above about 90° C. when the reaction is to be carried out in open equipment. Lower boiling solvents may, of course, be used where the reaction is carried out in closed equipment to prevent boiling off the solvent at the temperatures of the reaction. Solvents boiling at substantially more than 140° C. are different to remove from a final chain-extended elastomer at desirable working temperatures, although it will be obvious that higher boiling solvents may be employed where the excess solvent is removed by means other than by heating or distillation. The solvent, when used, may be added at the beginning, at an intermediate point, or at the end of the prepolymer reaction stage, or after cooling of the formed prepolymer. The solvents to be used are preferably those in which the reactants have some solubility but in which the final chain-extended product is insoluble. Ketones, tertiary alcohols and esters may be used. The aliphatic hydrocarbon solvents such as the heptanes, octanes and nonanes, or mixtures of such hydrocarbons obtained from naturally-occurring petroleum sources such as kerosene, or from synthetically prepared hydrocarbons, may sometimes by employed. Cycloaliphatic hydrocarbons such as methylcyclohexane and aromatic hydrocarbons such as toluene may likewise be used. Toluene and isopropyl acetate are preferred solvents. The amount of solvent used may be varied widely. From 25 to 400 parts of solvent per 100 parts of glycol have been found to be operable. The excess solvent, where large amounts are employed, may be separated partially or completely from the polymer prior to emulsification in the water solution. If an emulsion technique is to be employed in the chain extension, sometimes the excess solvent is useful and is allowed to remain during the emulsification stage.

The reactants are cooked for a period sufficient to react most, if not all, of the hydroxy groups, whereafter the prepolymer is allowed to stand and the free NCO content determined.

Usual pHs are employed during preparation of the prepolymer, the reaction preferably being maintained substantially neutral. Bases accelerate the reaction, acids retard the reaction, and preferably neither are added.

These isocyanate group-containing polyurethanes are then reacted with an epoxy-containing compound such as glycidol, for example, at temperatures of about 25° C. to about 45° C., usually in the presence of a catalyst which promotes urethane formation.

In the process of the invention, the epoxy group-containing compound is reacted with a material selected from the group consisting of amine salts, phosphine-acid mixtures and sulfide-acid mixtures to form quaternary onium salt group-containing resins.

The process of this invention can be used to produce essentially epoxy group-free resins as well as epoxy group-containing resins. Where the epoxide is reacted with at least about a stoichiometric amount of amine salt, sulfide or phosphine, essentially epoxide group-free resins are produced; where resin containing free epoxide groups are desired, the ratio of starting polyepoxide to amine salt, sulfide or phosphate is selected so as to provide an excess of epoxy groups, thereby producing a resin containing free unreacted epoxide groups. Epoxy-free resin can also be provided by hydrolysis or post reaction of the epoxide reaction product.

Examples of amine salts which may be employed include salts of ammonia; primary, secondary and tertiary amines, and preferably tertiary amines; salts or boric acid or an acid having a dissociation constant greater than that of boric acid and preferably an organic acid having a dissociation constant greater than about $1 \times 10^{-5}$. The presently preferred acid is lactic acid. Such acids include boric acid, lactic acid, acetic acid, formic acid, propionic acid, butyric acid, hydrochloric acid, phosphoric acid and sulfuric acid. The amines may be unsubstituted amines or amines substituted with nonreactive constituents such as halogens or hydroxylamines. Specific amines include dimethylethanolamine, salts of boric, lactic, propionic, formic, butyric, hydrochloric, phosphoric and sulfuric, or similar salts in triethylamine, diethylamine, trimethylamine, diethylamine, dipropylamine, 1-amino-2-propanol, and the like. Also included are ammonimum phosphate, as well as other amine and ammonium salts as defined above.

A distinct class of amine compounds within the broader class is amine containing one or more secondary or tertiary amino groups and at least one hydroxyl group.

In most cases, the hydroxyl amine employed corresponds to the general formula:

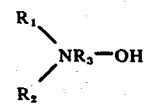

where $R_1$ and $R_2$ are, preferably, methyl, ethyl or lower alkyl groups, but can be essentially any other organic radical, so long as they do not interfere with the desired reaction. Benzyl, alkoxyalkyl and the like are examples. $R_1$ can also be hydrogen. The nature of the particular groups is less important that the presence of a secondary or tertiary amino nitrogen atom, and thus higher alkyl, aryl, alkaryl, aralkyl, and substituted groups of the types can be present. The group represented by $R_3$ is a divalent organic group, such as alkylene or substituted alkylene, e.g., oxyalkylene or poly(oxyalkylene), or even arylene, alkarylene or substituted arylene. $R_3$ can also be an unsaturated group, e.g., an alkylene group such as

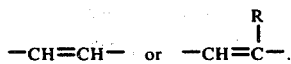

Other groups represented by $R_3$ include cyclic or aromatic groups. One type of useful amine, for instance, is represented by the formula:

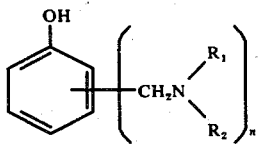

where $n$ is 1 to 3. Dialkanolamines, of the general formula $R_1N(R_3OH)_2$, and trialkanolamines, of the general formula $N(R_3OH)_3$, are also useful.

Some examples of specific amines are as follows: dimethylethanolamine, dimethylpropanolamine, dimethylisopropanolamine, dimethylbutanolamine, diethylethanolamine, ethylethanolamine, methylethanolamine, N-benzylethanol-amine, diethanolamine, triethanolamine, dimethylaminomethyl phenol, tris(dimethylaminomethyl)phenol, 2-[2(dimethylamino)ethoxy] ethanol, 1-[1-(dimethylamino)-2-propoxy]-2-propanol, 2-(2-[2-dimethylamino)ethoxy]ethoxy)ethanol, 1-[2-(dimethylamino)ethoxy] -2-propanol, 1-(-1[dimethylamino)-2-propoxy]-2-propoxy)-2-propanol, benzyl dimethyl amine.

Another distinct class of amine compound within the broader class is an amine containing one or more secondary or tertiary amino groups and

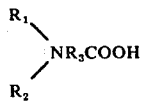

where $R_1$ and $R_2$ are each preferably methyl, ethyl, or other lower alkyl groups, but can be essentially any other organic radical, so long as they do not interfere with the desired reaction. Benzyl, alkoxyalkyl, and the like are examples. $R_1$ can also be hydrogen. The nature of the particular groups is less important than the presence of a secondary or tertiary amino nitrogen atom, and thus higher alkyl, aryl, alkaryl, and substituted groups of these types can be present. The group represented by $R_3$ is a divalent organic group, such as alkylene or substituted alkylene, e.g., oxyalkylene or poly(oxyalkylene), or less desirably, arylene, alkarylene or substituted arylene. $R_3$ can also be an unsaturated group, e.g., an alkylene group.

Such amines can be prepared by known methods. For example, an acid anhydride, such as succinic anhydride, phthalic anhydride or maleic anhydride, can be reacted with an alkanolamine, such as dimethylethanolamine or methyldiethanolamine; the group represented by $R_3$ in the amines produced in such cases contain ester groups. Other types of amines are provided, for example, by reacting an alkylamine with an alkyl acrylate or methacrylates such as methyl or ethyl acrylate or methacrylate, as described in U.S. Pat. No. 3,419,525. Preferably, the ester group is subsequently hydrolyzed to form a free carboxyl group. Other methods for producing amines of different types can also be employed.

It can be seen that the groups represented by $R_3$ can be of widely varying types. Some examples are: $-R'-$, $-R'OCOR'-$, and $-(R'O)_nCOR'-$, where each $R'$ is alkylene, such as

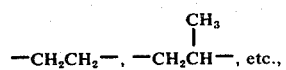

or alkenylene, such as $-CH=CH-$ such as $-CH=\lambda CH-$, and $n$ is 2 to 10 or higher. Other groups represented by $R'$ include cyclic or aromatic groups.

Some examples of specific amines are as follows:
N,N-dimethylaminoethyl hydrogen maleate
N,N-diethylaminoethyl hydrogen maleate
N,N-dimethylaminoethyl hydrogen succinate
N,N-dimethylaminoethyl hydrogen phthalate
N,N-dimethylaminoethyl hydrogen hexahydrophthalate
2-(2-dimethylaminoethyoxy) ethyl hydrogen maleate
1-methyl-2-(2-dimethylaminoethyoxy) ethyl hydrogen maleate
2-(2-dimethylaminoethoxy) ethyl hydrogen succinate
1,1-dimethyl-2-(2-dimethylaminoethoxy) ethyl hydrogen succinate
2-[2-(2-dimethylaminoethoxy) ethoxy] ethyl hydrogen maleate
beta-(dimethylamino)propionic acid
beta-(dimethylamino)isobutyric acid
beta-(diethylamino)propionic acid
1-methyl-2-(dimethylamino)ethyl hydrogen maleate
2-(methylamino)ethyl hydrogen succinate
3-(ethylamino)propyl hydrogen maleate
2[2-(dimethylamino)ethoxy]ethyl hydrogen adipate
N,N-dimethylaminoethyl hydrogen azelate
di(N,N-dimethylaminoethyl) hydrogen tricarballylate
N,N-dimethylaminoethyl hydrogen itaconate
1-(1-[1(dimethylamino)-2-propoxy]-2-propoxy)-2-propyl hydrogen maleate
2-]2-(2-[2-(dimethylamino)ethoxy]ethoxy)ethoxy]ethyl hydrogen succinate.

In one embodiment, the epoxy compounds described above may be reacted with an ester of boric acid or a compound which can be cleaved to form boric acid in a medium containing water and preferably an amino-containing boron ester and/or a tertiary amine salt of boric acid to produce the epoxy reaction products. The boron compound component utilized in producing the reaction products can be, for example, any triorganoborate in which at least one of the organic groups is substituted with an amino group. Structurally, such esters of boric acid or a dehydrated boric acid such as metaboric acid and tetraboric acid, although not necessarily produced from such acids. In most cases the boron esters employed correspond to one of the general formulas:

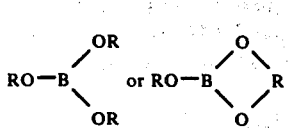

where the R groups are the same or different organic groups. The groups represented by R above can be virtually any organic group, such as hydrocarbon or substituted hydrocarbon, usually having not more than 20 carbon atoms and preferably not more than about 8 carbon atoms. The preferred esters have alkyl groups or polyoxyalkyl groups. At least one of the organic groups contains an amine group, i.e., a group of the structure:

where $R_1$ and $R_2$ are hydrogen or preferably methyl, ethyl or other lower alkyl groups, but can be essentially any other organic radical, so long as they do not interfere with the desired reaction. The nature of the particular groups is less important than the presence of an amino nitrogen atom, and thus higher alkyl, aryl, alkaryl, aralkyl and substituted groups of these types can be present. While both $R_1$ and $R_2$ can be hydrogen (i.e., the amino group is a primary amino group), it is preferred that at least one be an alkyl or other organic group, so that the amino group is secondary or tertiary.

The preferred boron esters correspond to the formula:

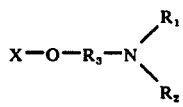

where X has the structure:

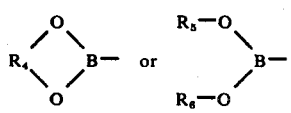

$R_3$ and $R_4$ being divalent organic radicals, such as alkylene or substituted alkylene, e.g., oxyalkylene or poly(oxyalkylene), or less desirably, arylene, alkarylene or substituted arylene. $R_5$ and $R_6$ can be alkyl, substituted alkyl, aryl, alkaryl, or other residue from essentially any monohydroxy alcohol derived by removal of the hydroxyl group. $R_5$ and $R_6$ can be the same or different.

Examples of boron esters within the above class include:

2-(beta-dimethylaminiosopropoxy)-4,5-dimethyl-1,3,2-dioxaborolane
2-(beta-diethylaminoethoxy)-4,4,6-trimethyl-1,3,2-dioxaborinane
2-(beta-dimethylaminoethoxy)-4,4,6-trimethyl-1,3,2-dioxaborinane
2-(beta-diisopropylaminoethoxy)-1,3,2-dioxaborinane
2-(beta-dibutylaminoethoxy)-4-methyl-1,3,2-dioxaborinane
2-(beta-diethylaminoethoxy)-1,3,2-dioxaborinane
2-(gamma-aminopropoxy)-4-methyl-1,3,2-dioxaborinane
2-(beta-methylaminoethoxy)-4,4,6-trimethyl-1,3,2-dioxaborinane
2-(beta-ethylaminoethoxy)-1,3,6-trioxa-2-boracyclooctane
2-(gamma-dimethylaminopropoxy)-1,3,6,9-tetraoxa-2-boracycloundecane
2-(beta-dimethylaminoethoxy)-4-4(4-hydroxybutyl)-1,3,2-dioxaborolane
Reaction product of $(CH_3)_2NCH_2CH_2OH$ + Lactic acid $+B_2O_3$ + neopentyl glycol.

A number of such boron esters are known. Many are described, for example, in U.S. Pat. Nos. 3,301,804 and 3,257,442. They can be prepared by reacting one mole of boric acid (or equivalent boric oxide) with at least 3 moles of alcohol, at least one mole of the alcohol being an aminosubstituted alcohol. The reaction is ordinarily carried out by refluxing the reactants with removal of the water formed.

The amine salts and the epoxy compound are reacted by mixing the components, preferably in the presence of a controlled amount of water. The amount of water employed should be that amount of water which allows for smooth reaction. Typically, the water is employed on the basis of about 1.75 percent to about 20 percent by weight based on the total reaction mixture solids and preferably about 2 percent to about 15 percent by weight, based on total reaction solids.

Another measure of the amount of water which may be employed is the equivalent ratio of water to amine nitrogen present in the reaction mixture. Typically the equivalent ratio of water to amine nitrogen is controlled between about 1.3 and about 16 equivalents of water per equivalent of amine nitrogen. Preferably, the ratio of water to amine nitrogen is controlled between about 1.5 and about 10.6 equivalents of water per equivalent of amine nitrogen.

The reaction temperature may be varied between about the lowest temperature at which the reaction reasonably proceeds, for example, room temperature, or in the usual case, slightly above ordinary room temperature to a maximum temperature between about 100° C. and about 110° C.

A solvent is not necessary, although one is often used in order to afford better control of the reaction. Aromatic hydrocarbons or monoalkyl ethers of ethylene glycol are suitable solvents.

The proportions of the amine salt and the epoxy compound can be varied and the optimum proportions depend upon the optimum proportions depend upon the particular reactants. Ordinarily, however from about one part to about 50 parts by weight of the salt per 100 parts of epoxy compound are employed. The proportions are usually chosen with reference to the amount of nitrogen, which is typically from about 0.05 to about 16 percent based on the total weight of the amine salt and the epoxy compound. Since the amine salt reacts with the epoxide groups of the epoxy resin employed, in order to provide an epoxy group-containing resin, the stoichiometric amount of amine employed should be less than the stoichiometric equivalent of the epoxide groups present, so that the final resin is provided with one epoxy group per average molecule.

Phosphonium group containing resins can be prepared by reacting the above epoxy compounds with a phosphine in the presence of an acid to form quaternary phosphonium base group containing resins.

The phosphine employed may be virtually any phosphine which does not contain interferring groups. For example, the phosphine may be aliphatic, aromatic or alicyclic. Examples of such phosphines include lower trialkyl phosphine, such as trimethyl phosphine, triethyl phosphine, tripropyl phosphine, tributyl phosphine, mixed lower alkyl phenyl phosphines such as phenyl dimethyl phosphine, phenyl diethyl phosphine, phenyl dipropyl phospine, diphenyl methyl phosphine, diphenyl ethyl phosphine, diphenyl propyl phosphine, triphenyl phosphine, alicyclic phosphines such as tetramethylene methyl phosphine and the like.

The acid employed may be virtually any acid which forms a quaternary phosphonium salt. Preferably the acid is an organic carboxylic acid. Examples of the acids which may be employed are boric acid. lactic acid, formic acid, acetic acid, propionic acid, butyric acid, hydrochloric acid, phosphoric acid, and sulfuric acid. Preferably the acid is an acid having a dissoaiation constant greater than about $1 \times 10^{-5}$.

The ratio of phosphine to acid is not unduly critical. Since one mole of acid is utilized to form one mole of phosphonium group, it is preferred that at least about one mole of acid be present for each mole of desired phosphine-to-phosphonium conversion.

The phosphine/acid mixture and the epoxy compound are reacted by mixing the components, sometimes at moderately elevated temperatures. The reaction temperature is not unduly critical and is chosen depending upon the reactants and their rates. Frequently the reaction proceeds well at room temperature or temperatures up to 70° C., if desired. In some cases, temperatures as high as about 110° C. or higher may be employed. The proportions are usually chosen with reference to the amount of phosphine, which is typically from about 0.1 to about 35 percent based on the total weight of the phosphine and the epoxy compound.

Sulfonium group containing resins can be prepared by reacting the above epoxy compounds with a sulfide in the presence of an acid to form quaternary sulfonium base group containing resins.

The sulfide employed may be virtually any sulfide which reacts with epoxy groups and which does not contain interfering groups. For example, the sulfide may be aliphatic, mixed aliphatic-aromatic, aralkyl or cyclic. Examples of such sulfides include dialkyl sulfides such as diethyl sulfide, dipropyl sulfide, dibutyl sulfide, dihexyl sulfide, phenyl sulfide or alkyl phenyl sulfides such as diphenyl sulfide, ethyl phenyl sulfide, alicyclic sulfides such as tetramethylene sulfide, pentamethylene sulfide, hydroxyl alkyl sulfides such as thiodiethanol, thiodipropanol, thiodibutanol and the like.

The acid employed may be virtually any acid which forms a quaternary sulfonium salt. Preferably the acid is an organic carboxylic acid. Examples of acids which may be employed are boric acid, formic acid, lactic acid, acetic acid, propionic acid, butyric acid, hydrochloric acid, phosphoric acid and sulfuric acid. Preferably the acid is an acid having a dissociation constant greater than about $1 \times 10^{-5}$.

The ratio of sulfide to acid is not unduly critical. Since one mole of acid is utilized to form one mole of sulfonium group, it is preferred that at least about one mole of acid be present for each mole of desired sulfide-to-sulfonium conversion.

The sulfide/acid mixture and the epoxy compound are reacted by mixing the components, usually at moderately elevated temperatures such as 70°–110° C. A solvent is not necessary, although one is often used in order to afford better control of the reaction. Aromatic hydrocarbons, monoalkyl ethers of ethylene glycol, aliphatic alcohols are suitable solvents. The proportions of the sulfide to the epoxy compound can be varied and the optimum proportions depend upon the particular reactants. Ordinarily, however, from about one part to about 50 parts be weight of the sulfide per 100 parts of epoxy compound is employed. The proportions are usually chosen with reference to the amount of sulfur, which is typically from about 0.1 to about 25 percent, based on the total weight of the sulfide and the epoxy compound.

Since the sulfide or phosphine react with the epoxy group, where epoxy group-containing products are desired, less than an equivalent of sulfide or phosphine should be employed so that the resultant resin has one epoxy group per average molecule.

Where it is desired to incorporate boron into the resin molecule, one method is to incorporate boron by means of an amine borate or nitrogen-containing ester as described in copending Application Ser. No. 100,825, filed Dec. 22, 1970, the disclosure of which is hereby incorporated by reference. The boron compound reacts with available epoxy groups to provide quaternary ammonium borate groups in the resin molecule.

The reaction of the boron compound may be concluded simultaneously with sulfonium or phosphonium group formation since the reaction conditions are similar.

The particular reactants, proportions and reaction conditions should be chosen in accordance with considerations well known in the art, so as to avoid gelation of the product during the reaction. For example, excessively severe reaction conditions should not be employed. Similarly, compounds having reactive substituents should not be utilized along with epoxy compounds with which those substituents might react adversely at the desired conditions.

The pigment dispersant of the invention comprises the abovedescribed onium salt group solubilized resin where the ratio of quaternary onium salt in the resin to free epoxy groups in the precursor resin is greater than about 0.4 to 1 and preferably greater than 0.6 to 1. While the pigment dispersant is termed an epoxy resin, when the ratio of onium groups to epoxy groups is 1 to 1, essentially all the epoxy groups are reacted and the resin is essentially epoxy free. It has also been found that the presence of boron or a boron-type compound adversely affects the stability of the resultant paste. Accordingly, for most purposes, it is preferred that the use of boron be avoided.

The aqueous pigment pastes of the invention are prepared by grinding or dispersing a pigment in the presence of an aqueous dispersion of the abovedescribed pigment dispersant in a manner well known in the art.

The pigment paste comprises as essential ingredients the dispersant and at least one pigment; however, the paste may, in addition, contain other adjuvants such as plasticizers and the like, or wetting agents, surfactants or defoamers.

The pigment and dispersant may be ground in the conventional manner such as in a steel ball mill, attritor, or sand mill.

The pigment and dispersant ratios vary from pigment to pigment over a wide range, usually from about two percent to about 50 percent by weight of dispersant, based on pigment weight, may be used.

The final electrodepositable composition may contain, in addition to the pigment dispersion and an onium or amine salt group solubilized cationic electrodepositable vehicle resin, crosslinking resins, solvents, antioxidants, surfactants, and other adjuvants typically employed in the electrodepositable composition.

A number of amine group-containing, acid-solubilized, cationic electrodepositable resins are known in the art and need not be described in detail. Virtually any polyamine group-containing resin which can be acid-solubilized may be employed as a aqueous coating composition. Preferably the resin also contains hydroxyl groups. These resins include multicomponent resin systems which contain two essential components, for example, a polyamine group-containing resin together with a fully capped organic polyisocyanate described in copending Applications Ser. Nos. 47,917 filed June 19, 1970, and 193,590 filed Oct. 28, 1971, which are hereby incorporated by reference; as well as in systems containing an essentially self-curing resin system, for example, resin containing amine groups, hydroxyl groups and capped isocyanate groups within the same molecule, where the capped isocyanate groups are stable at room temperature in the presence of hydroxyl or amine groups but reactive with hydroxyl groups at elevated temperatures. Preferably, the isocyanate groups are capped with an aliphatic alkyl, alkoxyalkyl, cycloaliphatic alkyl, or aromatic alkyl monoalcohol or an oxime. Preferably, the resin contains about 0.5 to about 2.0 latent isocyanate groups per hydroxyl group. Resins within this class are described in copending Applications Ser. No. 193,591, filed Oct. 28, 1971, and Ser. No. 203,875, filed Dec. 1, 1971, which are hereby incorporated by reference.

The preferred vehicle resins are onium base salt solubilized cationic resins preferably containing epoxy groups. These resins are characterized quaternary onium group solubilized resins, preferably containing epoxy groups and optionally containing oxyalkylene groups and/or compounds of boron. Preferably these resins are solubilized by a salt of an acid havng a dissociation constant greater than $1 \times 10^{-5}$. Resins and electrodepositable compositions of this type are described in detail in copending applications Ser. Nos. 167,470, filed July 29, 1971, 167,476, filed July 29, 1971; 210,141, filed Dec. 20, 1971, and 217,278, filed Jan. 12, 1972, all of which are hereby incorporated by reference.

Enough pigment paste is used so that the final electrodepositable composition has the desirable properties. In most instances, the final electrodepositable composition has a pigment-to-binder ratio of between about 0.05 to about 0.5.

In electrodeposition processes employing the aqueous coating compositions described above, the aqueous composition is placed in contact with an electrically-conductive anode and an electrically-conductive cathode in an electric circuit. While in contact with the bath containing the coating composition, an adherent film of the coating composition is deposited on the cathode. This is in contrast to processes utilizing polycarboxylic acid resins which deposit on the anode, and many of the advantages described above are in large part attributed to this cathodic deposition.

The conditions under which the electrodeposition is carried out are, in general, similar to those used in electrodeposition of other types of coatings. The applied voltage may be varied greatly and can be, for example, as low as one volt or as high as several thousand volts, although typically between 50 volts and 500 volts. The current density is usually between about 1.0 ampere and 15 amperes per square foot, and tends to decrease during electrodeposition.

The method of the invention is applicable to the coating of any electrically-conductive substrate, and especially metals such as steel, aluminum, copper or the like.

After deposition, the coating is cured at elevated temperatures by any convenient method such as in baking ovens or with banks of infrared heat lamps.

Illustrating the invention are the following examples, which are not to be construed as limiting the invention to their details. All parts and percentages in the examples, as well as throughout this specification are by weight unless otherwise specified.

EXAMPLE A

A dimethylethanolamine lactate was prepared by mixing 13.3 parts of dimethylethanolamine and 18.0 parts of lactic acid (85 percent solution in water). The mixture was held at 40° C. to 60° C. for a short time and there was then added 7.2 parts of isopropanol. The final composition comprised 75 percent solids and contained 7.1 percent water.

EXAMPLE B

Into a reactor equipped with thermometer, stirrer, distillation apparatus with reflux and water trap, and means for providing an inert gas blanket where charged 741.6 parts of dimethylethanolamine, 714 parts lactic acid and 300 parts toluene. The reaction mixture was heated to between 105° C. and 110° C. for 4 hours. A total of 120 parts of water were collected wih an index of refraction of $n_D^{25}$ 1.377. There was then added 245 parts of boric oxide, 728 parts neopentyl glycol. The reaction mixture was heated between 115° C. and 128° C. for approximately four hours, collecting an additional 205 parts of water of reaction $n_D^{25}$ 1.386. The reaction product had a percent nitrogen content of 4.51 and has a proposed structure of:

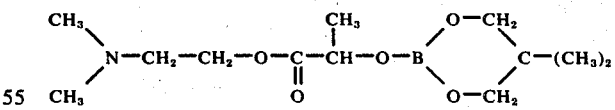

This product is hereinafter referred to as the product of Example B.

EXAMPLE I

Into a reactor equipped with thermometer, stirrer, reflux condenser, and means for providing an inert gas blanket where charged 342.8 parts of Epon 829 and 32.7 parts of Bisphenol A. The mixture was heated to 170° C., at which time an exotherm occurred The reaction mixture was held at 180° C. to 185° C. for about 45 minutes. The reaction mixture was then cooled to 130° C. with the subsequent addition of 158.7 parts of polypropylene glycol with an average molecular weight of about 425. There was then added a small amount of dimethyl ethanolamine as a catalyst and the reaction mixture was held at 130° C. to 140° C. for about 4 hours until the reaction mixture had a Gardner-Holdt viscosity of H to I, measured at 50 percent solids in a solvent comprising 90 percent isophorone and 10 percent toluene.

The reaction mixture was cooled to 130° C. and a small amount of formic acid added to neutralize the amine catalyst. The reaction product at this point had an epoxy equivalent, adjusted to 100 percent solids of 720. The reaction mixture was cooled to 90° C. and there was added 37.7 parts of 2-ethylhexanol containing a small amount of Foam Kill 639, an anti-foaming agent.

At 80° C. there was added a mixture of 57.5 parts of the product of Example B and 14.4 parts of isopropanol. This mixture was added over a 20 minute period at a reaction temperature of 89° C. The reaction product was held at 90° C. to 95° C. for five minutes after the addition was complete. There was then added 280 parts of deionized water. The product had an epoxy equivalent of 1663 at 60.7 percent solids and had a ratio of quaternary to epoxy groups of 0.24:1.

EXAMPLE II

Into a reactor equipped with thermometer, stirrer, reflux condenser and means for providing inert gas blanket were charged 1062 parts of Epon 829 and 181 parts of Bisphenol A. The mixture was heated to 170° C., at which time an exotherm occurred. The reaction mixture was held at 180° C. to 185° C. for 45 minutes. The reaction mixture was then cooled to 130° C. with the addition of 473 parts of polypropylene glycol with an average molecular weight of 600. There was then added 3.0 parts of dimethyl ethanolamine. The reaction mixture was held at 130° C. to 140° C. for about 4.5 hours. The reaction mixture then had a Gardner-Holdt viscosity of L+, measured at 50 percent solids, the additional solvent comprising 90 percent isophorone and 10 percent toluene. The reaction mixture at this point was analyzed to have an epoxy equivalent (adjusted to 100 percent solids) of 780 and a hydroxyl value (adjusted to 100 percent solids) of 303.

To the reaction mixture was added a small amount of formic acid to neutralize the catalyst. The reaction mixture was cooled to 70° C. and there was added a mixture of 731 parts of dimethyl ethanolamine, 158 parts of 85 percent lactic acid and 68 parts of isopropanol. This mixture was added at a temperature range of 70° to 100° C. over a 20-minute period. After the reaction was completed, the reaction mixture was held for five minutes at 100° C. There was then added 560 parts of deionized water and a mixture of 132 parts of 2-ethylhexanol and 9.7 parts of Foam Kill 639, an anti-foaming agent. There was then added an additional 327 parts of water. The product contained a ratio of 0.69 equivalent of quaternary nitrogen to one equivalent of epoxy.

EXAMPLE III

A first stage reaction product, the reaction of Epon 829 and Bisphenol A and polypropylene glycol was prepared as in Example II. The reaction mixture, after formic acid addition to neutralize the catalyst, was cooled to 70° C. and there was added a mixture of 85 parts of dimethyl ethanolamine, 4 parts 85 percent lactic acid and 84 parts of isopropanol. This mixture was added over a 20 minute period at temperatures of 70° C. to 100° C. The reaction mixture was held at 100° C. for an additional five minutes. There was then added 120 parts of 2-ethylhexanol contained 9.2 parts of Foam Kill 639. There was then added an additional 800 parts of deionized water. The resultant product had an epoxy equivalent, adjusted to 100 percent solids, of 2,500 and a hydroxyl value, adjusted to 200 percent solids, of 84.3. The resin contained a ratio of quaternary groups to epoxy groups of 0.41:1.

EXAMPLE IV

A first stage reaction product was prepared as in Example II. After the reaction of the Epon 829, Bisphenol A and polypropylene glycol, formic acid was added to neutralize the catalyst. The reaction mixture was cooled to 70° C. and there was added a mixture of 189 parts of dimethyl ethanolamine, 227 parts of 85 percent lactic acid and 95 parts of isopropanol. This mixture was added over a 20-minute period at a temperature range of 70° C. to 100° C. The reaction mixture was held for 5 minutes at 100° C. after the addition was complete. There was then added 500 parts of deionized water, 146 parts of 2-ethyl hexanol containing 10.3 parts of Foam Kill 639. There was then added an additional 330 parts of deionized water. The epoxy equivalent of the reaction mixture was infinite and the reaction mixture had a hydroxyl value, adjusted to 100 percent solids, of 72.8. The ratio of quaternary groups to epoxy groups was 1:1.

EXAMPLE V

Into a reactor equipped with thermometer, stirrer, reflux and condenser and means for providing an inert gas blanket was charged 330 parts of Epon 829 and 112 parts of Bisphenol A. The reaction mixture was heated to 170° C., at which time an exotherm occurred. The reaction mixture was held at 180° C. to 185° C. for 45 minutes. The reaction mixture was cooled at 95° C. and there was added a mixture of 94.5 parts of the product of Example A and 7.0 parts of water, the reaction temperature dropped to 78° C. and the reaction mixture was cloudy. After 10 minutes, the reaction temperature had raised to 95° C. and the reaction mixture cleared. The reaction mixture was held at 95° C. for an additional 30 minutes. There was then added an additional 150 parts of deionized water. The reaction product had an epoxy equivalent of 6,400 adjusted to 100 percent solids and a hydroxyl value adjusted to 100 percent solids of 125. The product had a quaternary-to-epoxy ratio of 0.48:1.

EXAMPLE VI

A first stage reaction product was prepared as in Examples II and III. There was added a solution of 180 parts of isopropanol, 96 parts of the product of Example B, over 20 minutes at a reaction temperature of 78° C. to 85° C. The product was held at 85° C. to 97° C. for an additional 5 minutes after the reaction was complete. There was then added 300 parts of deionized water and a solution of 114 parts of 2-ethylhexanol containing 9 parts of Foam Kill 639. The final product had an epoxy equivalent, adjusted to 100 percent solids of 920 and a hydroxyl value adjusted to 100 percent solids of 171. The product had a quaternary-to-epoxy ratio of 0.15:1.

EXAMPLE VII

A first stage reaction product was prepared as in Examples II and III. There was added a solution of 180 parts of isopropanol, 96 parts of the product of Example B, over 20 minutes at a reaction temperature of 78° C. to 85° C. The product was held at 85° C. to 97° C. for an additional five minutes after the reaction was complete. There was then added 300 parts of deionized water and a solution of 114 parts of 2-ethylhexanol containing 9 parts of Foam Kill 639. The final product had an epoxy equivalent, adjusted to 100 percent solids of 920 and a hydroxyl value adjusted to 100 percent solids of 171. The product had a quaternary-to-epoxy ratio of 0.15:1.

EXAMPLE VIII

Into a reactor equipped with thermometer, stirrer, reflux condenser and means for providing an inert gas blanket were charged 1035 parts of Epon 829 and 335 parts of Bisphenol A. The mixture was heated to 170° C. at which time an exotherm occurred. The reaction mixture was held at 180° C. to 185° C. for 40 minutes. The reaction mixture was then cooled to 130° C. There was added a mixture of 192 parts of 2-ethylhexanol containing 8.6 parts of Foam Kill 639. To the reaction mixture at 110° C. was added a mixture of 512 parts of the product of Example A and 100 parts of deionized water. The reaction temperature dropped with the addition to 87° C. and the reaction mixture was milky. The reaction temperature was raised to 90° C. and the reaction mixture cleared in 10 minutes. The reaction mixture was held between 90° C. and 100° C. for an additional 30 minutes. There was then added 92 parts of isopropanol and 175 parts of deionized water. The product had an infinite epoxy equivalent and had a hydroxyl value adjusted to 100 percent solids of 103. The product contained a quaternary-to-epoxy ratio of 1:1.

EXAMPLE IX

Into a reactor equipped with thermometer, stirrer, reflux condenser and means for providing an inert gas blanket were charged 1062 parts of Epon 829 and 181 parts of Bisphenol A. The mixture was heated to 150° C. at which time an exotherm occurred. The reaction mixture was held at 160 to 165° C. for about 45 minutes, after which time were added 474 parts of polypropylene glycol with an average molecular weight of 600. The reaction mixture was then cooled to 130° C., at which time 3.3 parts of dimethylethanolamine were added. The reaction mixture was held at 130° C. to 135° C. for about 5 hours and was then allowed to cool. To the reaction mixture at about 134° C. were added 123 parts of 2-ethylhexanol and 8.5 parts of Foam-Kill 639. To the reaction mixture of 107° C. were added 6.25 parts of 75 percent lactic acid. To the reaction mixture (temperature 100° C) were then added 239.2 parts of the product of Example A and 224.5 parts of a 4.5 percent solution of boric acid. The reaction temperature dropped with the addition to 90° C. and the reaction mixture was milky. The reaction temperature was raised at 96° C. and the reaction mixture cleared in 10 minutes. The reaction mixture was held between 90 and 100° C. for an additional 10 minutes. There was then added 52 parts of a boric acid solution. The product had an epoxy equivalent of 2,570 and had an hydroxyl value of 60.1 at 76.1 percent solids. The product contained a quaternary-to-epoxy ratio of 0.5:1.

EXAMPLE X

Into a reactor equipped with a thermometer, stirrer, reflux condenser and means for providing an inert gas blanket were charged 300 parts of ethylene glycol monobutyl ether. While the charge was being heated, one quarter of the following monomer feed was gradually added to the reactor:

| Monomer Feed | Parts by Weight |
| --- | --- |
| Ethyl acrylate | 330 |
| Methyl methacrylate | 330 |
| 2-Hydroxyethyl acrylate | 180 |
| Glycidyl methacrylate | 300 |
| Styrene | 60 |
| Azo bis (isobutyronitrile) | 18 |
| Tertiary dodecyl mercaptan | 36 |

The reaction mixture was heated to 150° C. at which time an exotherm occurred. The mixture was held at 145° C. for another 5 minutes at which time the addition of the initial one quarter of the monomer feed was complete. The reaction mixture was then cooled to about 125° C., at which time the rest of the monomer feed was gradually added thereto. The addition was complete after about 2 hours at which time the temperature was 137° C. The mixture was held at 125° C. to 135° C. for about 3 and a half hours and was then cooled to room temperature. Ionol 185 (polymerization inhibitor available from Shell, Industrial Chemical Division) (1.2 parts) was then added to the mixture.

Four-hundred and eighty parts of the resultant product were charged to a second reactor, and heating was begun. When the temperature had reached 95° C., 179 parts of thiodiethanol, 155 parts of 85 percent lactic acid and 100 parts of deionized water were added. The temperature was maintained at about 100° C. for about 45 minutes, after which the product was allowed to cool. The product had an infinite epoxy equivalent, a hydroxyl value of 210, and consisted of 71 percent solids. The product contained a quaternary-to-epoxy ratio of 1:1.

EXAMPLE XI

The following pigment pastes were all ground in conventional grinding equipment to a Hegmann Grind Gauge reading of 7+. Paste stability was checked by storing the paste in a hot room at 110° F.

A. A paste was formed from 205.6 parts of the resin of Example I, 190.8 parts of deionized water and 500 parts of titanium dioxide. The resultant pigment paste was stored in a hot room over night. The next morning the paste had gelled.

B. A paste was formed from 205 parts of the resin of Example II, 533 parts of titanium dioxide and 162 parts of deionized water, to yield a pigment-binder ratio of 4:1 at 75 percent solids. The initial Brookfield viscosity was 6,700 centipoises at 25° C. The paste was stored at 110° F. After 3 days, the viscosity was 6,700 centipoises; after ten days — 9,400 centipoises; 17 days — 12,000 centipoises; 24 days — 11,200 centipoises; and 31 days — 12,000 centipoises. The test was discontinued.

C. A pigment paste was formed from 202 parts of the resin of Example III, 526 parts of titanium dioxide and 172 parts of deionized water to yield a pigment-binder ratio of 4:1 and a solids content of 73 percent. The initial viscosity of the pigment paste was 4,000 centipoises. Upon storing at 110° F., the following viscosities were observed: 3 days — 4,800; 10 days — 10,200; 17 days — 52,000 24 days — the pigment paste had gelled.

D. A pigment paste was formed from 208 parts of the resin of Example IV, 540 parts of titanium dioxide and 152 parts of deionized water to yield a pigment paste with a pigment-binder ratio of 4:1 at 75 percent solids. The pigment paste had an initial viscosity of 8,800 centipoises. Storage at 110° F., showed the following viscosities: 3 days — 11,000 centipoises; 10 days — 11,400 centipoises; 17 days — 12,000 centipoises; 24 days — 12,000 centipoises; 31 days — 12,000 centipoises. The test was discontinued.

E. A pigment paste was formed from 199 parts of the resin of Example V, 540 parts of titanium dioxide and sufficient water to yield 72 percent solids. The paste had a pigment-binder ratio of 4:1. The initial viscosity of the paste was 3,400 centipoises. After 7 days at 110° F., the paste had gelled.

F. A pigment paste was formed from 188 parts of the resin of Example VI, 560 parts of titanium dioxide and 211 parts of deionized water to yield a pigment paste which had a pigment-binder ratio of 4:1 at 73 percent solids. The paste gelled while grinding.

G. A pigment paste was formed from 200 parts of the resin of Example VII, 240 parts of deionized water, 490.2 parts of titanium dioxide, 54.5 parts of china clay, 1.2 parts of red iron oxide, 12.2 parts of yellow iron oxide and 2 parts of carbon black. The pigment paste had an initial viscosith of 3,800 centipoises. After storage at 110° F., at the end of 3 days the paste displayed a viscosity of 69,000 centipoises and at 11 days — 336,000 centipoises.

H. The pigment paste of G was repeated, however, containing in addition 14 parts of polypropylene glycol 600. The initial viscosity was 4,400. After 3 days, the pigment paste had a viscosity of 23,600 centipoises; after 11 days — 106,800.

I. A pigment paste was formed from 143 parts of the resin of Example VIII, 171 parts of deionized water, 396 parts of titanium dioxide and 4 parts of carbon black. The pigment paste had an initial viscosity of 70,000 centipoises. After storage at 110° F., for 2 weeks, the paste had gelled.

J. A pigment paste was formed from 195 parts of the resin of Example IX, 330 parts of deionized water, 534 parts of titanium dioxide, 6 parts of Syloid 161 (ethanolated alkyl guanadine, from American Cyanamid) and 6 parts of Aersol C-61 (Grace Davison Chem.). After storage at 110°F., for 31 days, the paste was still stable and the test was discontinued.

Other resins and pigment pastes can be formed using varied reactants and reaction conditions and constituents as set forth in the specification to provide compositions which display pigment paste stabilities of an improved nature.

According to the provisions of the Patent statutes, there are described above the invention and what are now considered to be its best embodiments. However, within the scope of the appended claims, it is to be understood that the invention can be practiced otherwise than as specifically described.

We claim:

1. In a method of electrocoating an electrically-conductive surface serving as a cathode in an electrical circuit comprising said cathode, an anode and an electrodepositable composition, said method comprising passing electric current between said cathode and said anode in contact with said electrodepositable composition, the improvement wherein said electrodepositable composition comprises:
   A. a cationic electrodepositable resin; and
   B. a stable aqueous pigment paste comprising:
      1. 2 to 50 percent by weight based on weight of (2) of a water-dispersible cationic polymer produced by reacting a 1,2-epoxy group-containing material with a material selected from the group consisting of amine salts, phosphine-acid mixtures and sulfide-acid mixtures, said cationic polymer having a ratio of final quaternary onium salt groups to initial epoxide groups greater than about 0.4 to 1; and
      2. a pigment dispersed therein.

2. The method of claim 1 wherein the resin (A) is a polyamine or polyquaternary onium group-containing resin.

3. The method of claim 2 wherein the onium salt of said pigment is an ammonium salt.

4. The method of claim 1 wherein the ratio of final quaternary onium salt groups to initial epoxide groups in said pigment paste is greater than about 0.6 to 1.

* * * * *

UNITED STATES PATENT AND TRADEMARK OFFICE
CERTIFICATE OF CORRECTION

PATENT NO. : 4,035,275
DATED : July 12, 1977
INVENTOR(S) : Lance C. Sturni and Joseph F. Bosso It is certified that error appears in the above-identified patent and that said Letters Patent are hereby corrected as shown below:

Column 1, line 29, "elctrodepositable" should be --electrodepositable--.

Column 1, line 48, "presentlypreferred" should be --presently-preferred--.

Column 3, line 65, "hexane" should be --hexene--.

Column 7, line 38, "different" should be --difficult--.

Column 18, line 5, "contained" should be --containing--.

Column 18, line 9, "200" should be --100--.

Column 19, line 64, "at" should be --to--.

Signed and Sealed this

Twenty-seventh Day of September 1977

[SEAL]

Attest:

RUTH C. MASON
*Attesting Officer*

LUTRELLE F. PARKER
*Acting Commissioner of Patents and Trademarks*